(12) United States Patent
Neumeier (10) Patent No.: US 8,037,791 B2
(45) Date of Patent: Oct. 18, 2011

(54) TOOL CLAMPING DEVICE AND TOOL HOLDER

(75) Inventor: Manfred Neumeier, Esslingen (DE)

(73) Assignee: ESA Eppinger GmbH, Denkendorf (DE)

( * ) Notice: Subject to any disclaimer, the term of this patent is extended or adjusted under 35 U.S.C. 154(b) by 514 days.

(21) Appl. No.: 12/313,942

(22) Filed: Nov. 26, 2008

(65) Prior Publication Data

US 2009/0133547 A1 May 28, 2009

(30) Foreign Application Priority Data

Nov. 28, 2007 (DE) .......................... 10 2007 057 640

(51) Int. Cl.
*B23B 29/12* (2006.01)
*B23Q 1/28* (2006.01)

(52) U.S. Cl. ........................................ 82/158; 29/48.5 A (58) Field of Classification Search .................... 82/158, 82/121, 120, 159, 160; 409/144, 235, 230; 29/39, 49, 48.5 A
See application file for complete search history.

(56) References Cited

U.S. PATENT DOCUMENTS

| | | | | |
|---|---|---|---|---|
| 1,934,358 A | * | 11/1933 | Kylin | 29/49 |
| 2,470,218 A | * | 5/1949 | McNamara | 279/20 |
| 2,597,619 A | * | 5/1952 | Clark | 407/9 |
| 3,142,215 A | * | 7/1964 | Mancuso | 82/158 |
| 3,286,595 A | * | 11/1966 | Wollenhaupt | 483/32 |
| 3,355,798 A | * | 12/1967 | Drechsler | 483/63 |
| 4,354,306 A | * | 10/1982 | Ida et al. | 483/32 |
| 4,922,591 A | * | 5/1990 | Campbell | 483/1 |

FOREIGN PATENT DOCUMENTS

| | | |
|---|---|---|
| DE | 3929802 | 11/1990 |
| DE | 19860184 | 8/1999 |
| DE | 19940330 | 6/2001 |

* cited by examiner

*Primary Examiner* — Will Fridie, Jr.

(74) *Attorney, Agent, or Firm* — Emch, Schaffer, Schaub & Porcello Co., L.P.A.

(57) ABSTRACT

A tool clamping device having a tool holder (2) holding a tool (7, 8) for insertion into a socket of a tool support (1), such as a turret disc is designed such that a receiving body (16) of the tool holder and the tool support (1) have bearing surfaces (16, 3) to be arranged to one another and devices (14, 15) for fastening the tool holder on the tool support. The receiving body or the tool support has at least one stopping means (28), which projects axially over its bearing surface and is disposed on one side of the receiving body or tool support. The tool support or the receiving body has at least one contact surface for the stopping means. There is provided elastic means (36, 44) by means of which the stopping means can be laterally held in place on the contact surface under prestress.

39 Claims, 6 Drawing Sheets

Fig.10

TOOL CLAMPING DEVICE AND TOOL HOLDER

BACKGROUND OF THE INVENTION

The invention relates to a tool clamping device comprising a tool holder holding a stationary or driven tool for insertion into a socket of a tool support, such as a turret disc, and a tool holder for use with such a tool clamping device, said tool holder comprising a receiving body, which has a bearing surface by means of which it rests on a corresponding bearing surface of the tool support when the tool holder is inserted into a socket of the tool support.

SUMMARY OF THE INVENTION

Depending on the machining task and predefined working area, tool holders for stationary or driven tools are used interchangeably on a tool support, such as a turret disk, primarily in CNC lathes and CNC machining centers.

Considerable cost advantages are achieved to some extent by combining turning and milling operations, and appropriately designed CNC lathes or CNC turn-mill centers are therefore being used more and more. Due to the existing cost pressure, it is continuously necessary to optimize the function and price of machines and tools. There therefore exists the problem of fastening tool holders on the corresponding tool support in a particularly easy, cost-optimized manner, wherein the alignment process is supposed to occur precisely and effortlessly during the manual mounting process. To this end, the highest requirements are today placed on the positional accuracy of the tools and their holders in relation to the tool support. Alignment means that cooperate with the tool support are therefore provided on the tool holders for positionally accurate adjustment of the tool holder in relation to the tool support.

Star turrets, upon which several tool holders can be interchangeably mounted and directly seated on bearing surfaces by means of fastening screws, are used as tool supports for machining lathe pieces and milled parts. The bearing surfaces are allocated to the individual work stations, in which the star turret can switch the tool holders consecutively.

A tool support arrangement, especially for lathes with interchangeable tool holders, and a tool clamping device for the tool holders of such a star turret are known from DE 39 29 802 C1 and DE 199 40 330 C2. In the first abovementioned tool support arrangement, which has a tool support, in particular a turret head, which has several mounting surfaces between two end faces, an insertion hole extends from each mounting surface, and several interchangeable tool holders are provided, and the arrangement is made so that at least one of the tool holders has two lateral extensions which each engage one end-face margin of the tool support and support themselves on it. Mounted on each of these extensions is an adjusting member which can be clamped against the adjacent end-face margin of the tool support and in the clamped state exerts a reaction force on the tool holder, which reaction force is eccentric with regard to the associated shank. Setting the adjusting member is not quite simple and requires a substantial degree of care. In the second abovementioned tool clamping device, there is provided a tool holder, which receives a tool and fits into the socket of a tool support, such as a turret disc, in which the tool holder and the tool support have mutually allocated bearing surfaces. The tool holder has at least two spaced setting members and the tool support has at least two contact bearing positions allocated to the setting members, and the setting members lie tight against the bearing positions when the tool holder is inserted in the socket. The setting members can be accurately adjusted in axial position of the tool holder relative to the socket through adjusting means on the holder. The bearing positions on the tool support are designed on at least one receiving groove of the tool support, and the receiving groove is allocated to the tool support in the area of the contact surface.

Proceeding from this state of the art, the present invention provides an improved tool clamping device of the type mentioned in the introduction such that the interchangeable tool holder is aligned and fastened to the tool support with precisely correct alignment in a manner that is simpler and easier to operate than prior art devices.

In the new tool clamping device, the receiving body of the tool holder or the tool support has at least one stopping means, which projects axially over its bearing surface and is disposed on one side of the receiving body or tool support and by means of which the tool holder can be aligned in a precisely defined position in relation to the tool support. The tool support or tool holder has at least one contact surface for the stopping means, the stopping means being designed for engaging the contact surface. The stopping means and/or the contact surface has/have an insertion device that facilitates the mutual engagement, and there is provided elastic means, which is separate from the stopping means and laterally holds the stopping means in place on the contact surface under prestress.

In a preferred embodiment, the stopping means has a single-piece or multiple-piece stop strip, which is detachably fastened to the receiving body or tool support in an advantageous manner. But embodiments in which the stop strip is integrally formed on the receiving body or tool support are also within the scope of this invention.

In the case of the detachable design, the stop strip is advantageously positioned in a true-to-size bearing surface of the receiving body or tool support. The two mutually opposite broad faces of the stop strip can be alternatively designed to engage a contact surface. In a base body of the tool holder or tool support which has a receiving surface for a stop strip on each of its two sides, which are preferably located opposite one another, this opens the possibility of optionally positioning the stop strip on one or the other of the receiving surfaces such that one of its broad faces can be brought into engagement with the contact surface of the tool support or tool holder. This measure makes it possible to position and fasten the tool holder on the tool support with a different orientation without requiring major modifications.

In embodiments of the tool holder in which its receiving body has a coupling body projecting axially over its bearing surface, such as in the form of a cylindrical shank or shank with a polygonal cross section, and the axis of the coupling body is aligned perpendicular to the bearing surface whereas the tool support is embodied with a location hole for the coupling body in the area of its receiving surface, the elastic means is advantageously disposed in the area of the coupling body and/or location hole. To this end, the elastic means can have at least one spring element, which supports itself on the tool holder and by means of which the receiving body, which is aligned by the stopping means, can be pressed against the tool holder under prestress.

The new tool clamping device permits simple, precisely oriented mounting of the tool holder on the tool support, such as a tool turret. The spring means causes the base body of the tool support to be automatically aligned on the end face of the tool support so that at the end of assembly it only remains necessary to tighten the fastening means.

The subject matter of the invention also includes a tool holder for use in a tool clamping device of the described type comprising a base body having fastening means, a bearing surface and at least one receiving or bearing surface disposed on one side of the receiving body for a stopping means, which projects axially over the bearing surface and, in a preferred embodiment, has a single-piece or multiple-piece stop strip, which can be integrally formed on the receiving body or be detachably fasted thereto with special advantage.

Other features and properties of the new tool clamping device and of the new tool holder are subject matter of the dependent claims.

DETAILED DESCRIPTION OF THE PREFERRED EMBODIMENT(S)

Figure 1:
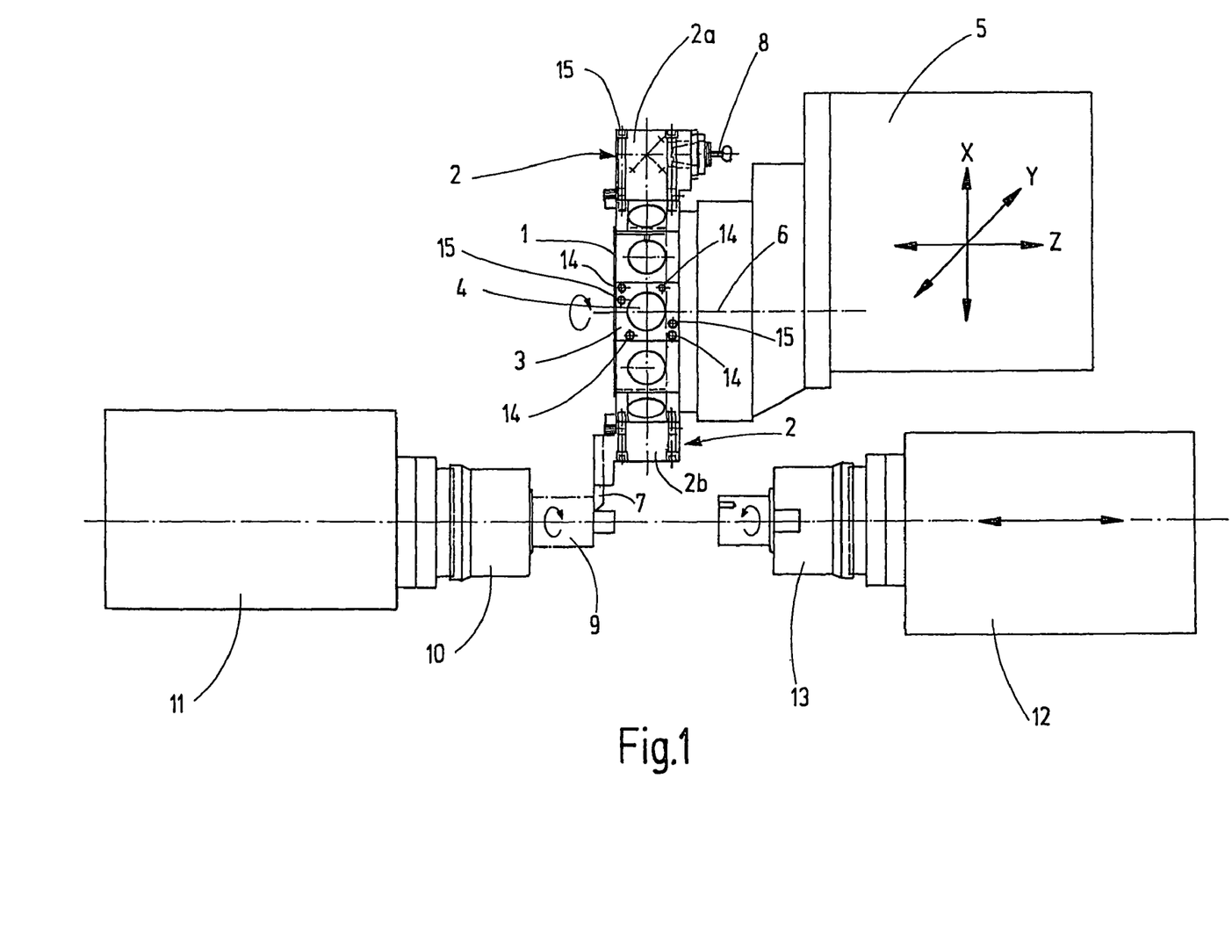
FIG. 1 shows a tool clamping device according to the invention comprising a tool holder and a tool support in the form of a star turret, in schematic representation and in top view.

The tool clamping device illustrated in FIG. 1 has a tool support 1 in the form of a turret disc, which is part of a known star turret, which has radially disposed tool holders 2 and is not illustrated in detail. The tool support 1 is designed as a regular polygon and has, on its perimeter, planar bearing surfaces 3 which, together with a cylindrical location hole 4 proceeding radially outwards from the respective bearing surface 3, form a tool socket for a tool holder 2. The tool support 1 is part of a tool turret 5, which can ideally be driven along the axes X, Y, Z and can alternatively pivot the star turret forming the tool support 1 around a turret pivot axis 6 and index into the respective work station, into which stationary or driven tools 7 and 8 can be placed for use in machining a workpiece. The tools 7, 8 are each clamped into a tool holder 2. Two tool holders 2a, 2b are illustrated.

In the illustrated working position, a chosen tool, a stationary tool 7 in the form of a lathe tool in FIG. 1, engages a workpiece 9 to be machined and is clamped in the lathe spindle 10 of a stationary main headstock 11 or of a CNC lathe. The CNC lathe also has a second headstock 12 which can be driven in the Z axis and whose lathe spindle 13 can synchronously take over the workpiece 9, which has been machined on its first side, so that the workpiece can be machined on a first and a second side with tools of the tool holder 2 in a known manner.

In principle, the same relationships result when a turret disc, which is provided with bearing surfaces 3 and possibly location holes 4 on a flat side, is used as tool support 1, and the location holes 4 are then aligned parallel to the pivot axis 6 as is known in the art. In the area of each bearing surface 3, the tool support is provided with four threaded holes 14 for fastening a tool holder 2 by means of fastening screws.

Two locating pins 15, distributed as seen in FIG. 1, are likewise disposed between the threaded holes 14 in the area of the respective bearing surface 3.

Figure 2:
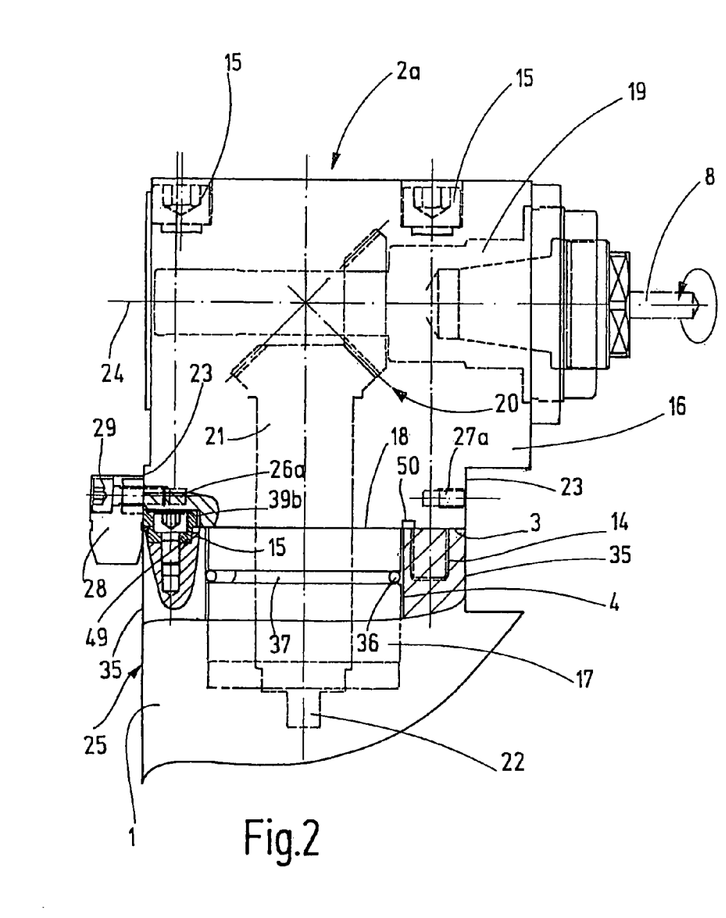
FIG. 2 shows a tool holder of the tool clamping system according to FIG. 1, in greater detail, mounted on the tool support illustrated in detail, in a side view.

FIG. 2 shows the tool holder 2a in an enlarged partial section from FIG. 1. The tool holder 2a, like tool holder 2b and all other tool holders disposed on tool support 1 but not illustrated, has a housing-shaped receiving body 16, which has a coupling body 17 in the form of a cylindrical shank projecting into the cylindrical location hole 4 of the tool support 1. The coupling body 17 is disposed running perpendicularly to a bearing surface 18 of the receiving body such that, as illustrated in FIG. 2, the bearing surface 18 of the tool holder 2a lies closely on the bearing surface 3 of the tool support 1 when the coupling body 17 is inserted into the location hole 4. A tool spindle 19, which clamps the driven tool 8 by means of a collet chuck for example, is rotatably mounted in the receiving body 16 and, by means of an angle drive 20, is coupled gearwise to a coupling shaft 21, which is likewise rotatably mounted in the receiving body 16 and, by means of a coupling piece 22, coupled to a drive shaft (not further illustrated), which is disposed in the tool holder 1 and enables the tool 8 to be put into rotation.

Figure 6:
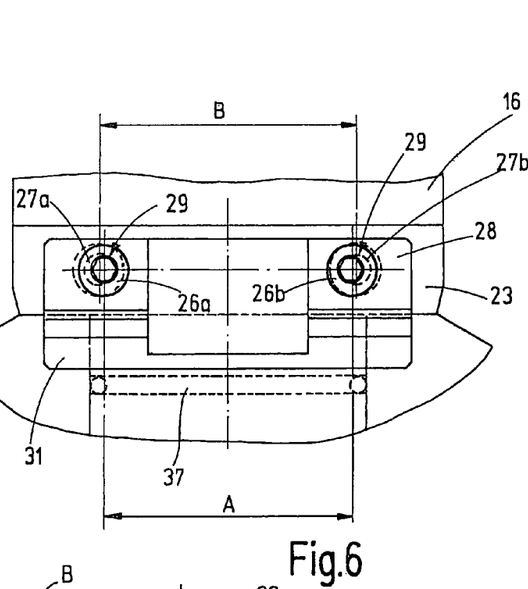
FIG. 6 shows the tool holder and the partially illustrated tool support of FIG. 5, in a side view of the stop strip.
Figure 7:
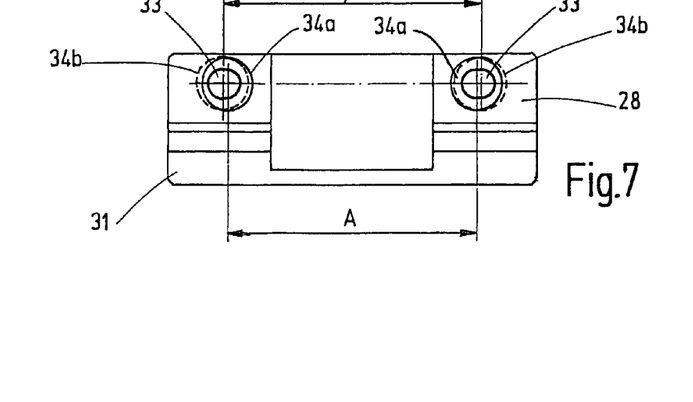
FIG. 7 shows the stop strip of the arrangement according to FIG. 5, in side view.

Two flat receiving surfaces 23, which are aligned parallel to one another and run perfectly perpendicular to the rotational axis 24 of the tool spindle 19 and are manufactured precisely spaced, are designed on the essentially parallelepiped-shaped body 16 on two sides located opposite one another and run perpendicularly to and adjacent to the bearing surface 18. The receiving surfaces 23 parallel to one another are true-to-size parallel to the face 25 of the tool support 1 when the tool holder 2 is mounted. Two threaded holes 26a, 26b and 27a, 27b, respectively, which each have a different spacing "A" and "B", as evident in FIGS. 6, 7, are provided in the receiving body 16 in the area of each of the receiving surfaces 23, as will still be explained in detail.

A stop strip 28, which is essentially rectangular in cross section and is detachably connected to the receiving body 16 by two screw bolts 29 screwed into the threaded hole 26a, 26b and forms a stopping means, is positioned on one of the receiving surfaces 23, in FIG. 2 this being the left face of the receiving body 16 facing away from the tool 8. The stop strip 28 can also be designed multiple-pieced.

Figure 5:
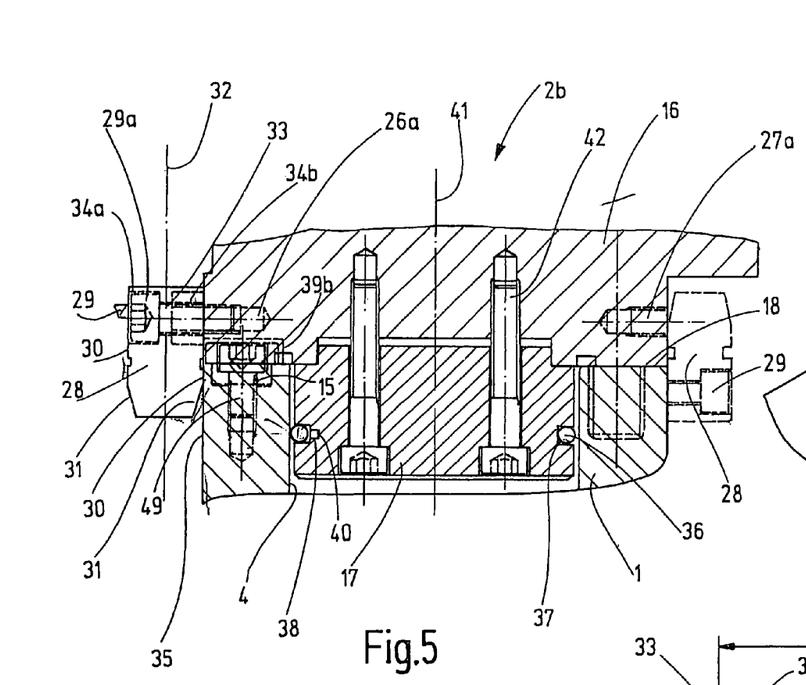
FIG. 5 is another embodiment of a tool holder according to the invention, in axial section, in a side view.

As is particularly evident from FIG. 5, the stop strip 28 has two true-to-size flat surfaces 30, which are parallel to one another on sides opposite one another, project axially over the bearing surface 18 of the receiving body 16 and run perpendicular to this bearing surface when the stop strip 28 is fastened to the receiving body 16. On the side located more distant from the screw bolts 29, two wedge-shaped insert bevels 31, which flow together, lie contiguous with the two surfaces 30. The stop strip 28 is designed symmetrical to a longitudinal center plane, indicated by 32 in FIG. 5, and is embodied with two through-holes 33 for receiving the screw bolts 29, the heads 29a of which are accommodated in screw-head indentations 34a and 34b which proceed from the opposite surfaces 30 and are allocated to the holes 33, as will still be explained in detail.

The face 25 of the tool support 1, at least adjacently to the bearing surface 3 at each work station, is designed as a true-to-size contact surface 35 which runs precisely perpendicular to the pivot axis 6 (FIG. 1). FIGS. 2 and 5 show that a broad-faced surface 30 of the stop strip 28 facing the receiving body 16 abuts the contact surface 35 of the tool support 1 when the stop strip 28 is in the mounted state, so that the receiving surface 23 of the tool holder 2 is aligned exactly perpendicular to the pivot axis 6 of the tool support 1. This means that the tool axis 24 runs exactly parallel to the pivot axis 6. In cooperation with the contact surface 35, the respective insert bevel 31 facilitates the attachment of the receiving body 16 onto the tool support 1. Together with the contact surface 35, it forms an insertion device facilitating the mutual engagement. It should be noted that a corresponding insert bevel could also be provided on the edge of the contact surface 35 of the tool support 1, it then being necessary to accordingly lengthen the surfaces 30 of the stop strip 28 toward the pivot axis 6.

Figure 3:
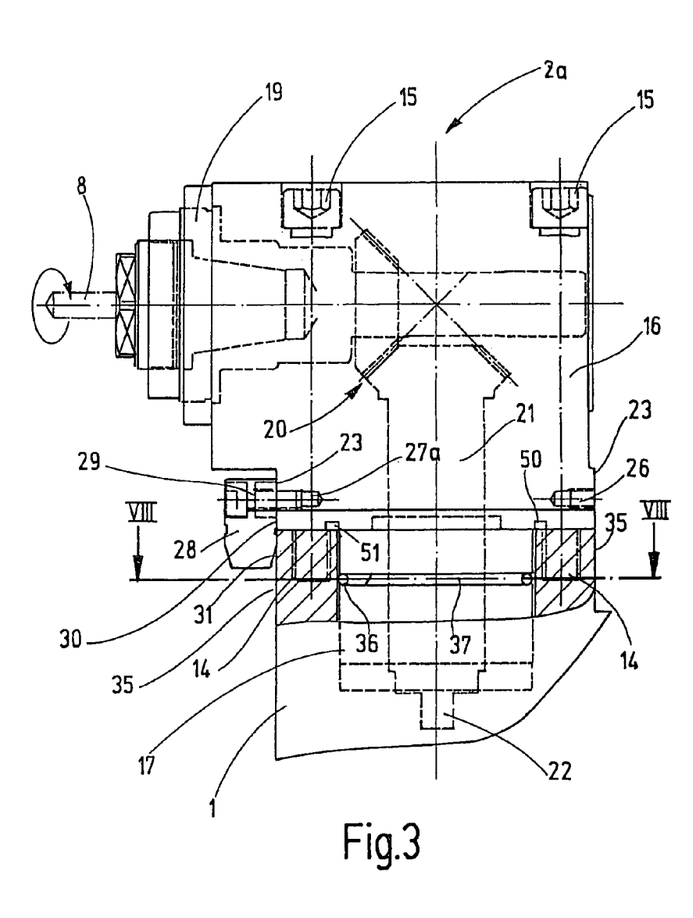
FIG. 3 is a view according to FIG. 2 illustrating the tool holder mounted on the tool support in a position rotated by 180°, in a side view.

Elastic means, which holds the stop strip 28 laterally adjacent to the stop surface 35 of the tool support 1 under prestress, is provided between the tool holder 2 and tool support 1 independently of the stop strip 28. In the illustrated embodiments, this elastic means is disposed on the coupling body 17. It has an elastic spring element which in the embodiment according to FIGS. 2, 3 and 5 is designed as an O-ring 36. The O-ring 36 is inserted into a peripheral groove 37 of the coupling body 17 and rests on a base 38 which fits into the bottom of the groove 37 and extends across a circumference of approximately 180°. The peripheral groove 37 could also be provided in the wall of the location hole 4, which we point out as a matter of form. The ends of the partially cylindrical base 38 are embodied with reduced radial thickness at 39 (FIG. 5), and a pin 40 holds the base 38 in the peripheral groove 37 in non-rotatable fashion. The base causes the O-ring 36 to project over the perimeter of the cylindrical coupling body on the side facing the stop strip 28 and to radially support itself on the wall of the location hole 4. The location hole 4 has a somewhat larger diameter than the cylindrical coupling body 17, so that the O-ring 36 places the surface 30 of stop strip 28 into contact with the contact surface 35 of the tool support 1 across the coupling body 17 and the base body 16 and holds it under prestress.

As illustrated in FIG. 3, the tool holder 2a can be rotated by 180° relative to the position according to FIG. 2 and thus be attached to the tool support 1 so that it works in the direction of the main headstock 11. A simple modification measure, in which the stop strip 28 is fastened to the receiving surface 23 of the receiving body 16 facing the tool 8 by means of the screw bolts 29, which are screwed into the threaded holes 27a, makes this possible. In addition, the base 38 is inserted into the peripheral groove 37 rotated by 180°, so that the O-ring 36 working as a spring element holds, again under prestress, the surface 30 of the stop strip 28 on the contact surface 35 of the tool support 1.

Also conceivable in principle are embodiments in which the turret disc forming the tool support 1 is embodied on two faces located opposite one another, each having a contact surface 35, or in which the turret disc has such a contact surface 35 only on its side facing the tool turret 5. Adaptation to the relationships of the respective turret disc is readily possible by mounting the stop strip 28 on the appropriate face of the tool holder 2. In cases in which it is not necessary or desirable to insert the tool holder into two positions rotated 180° to one another in correspondence with FIGS. 2 and 3, it is naturally sufficient to design the tool holder 2 with only one receiving surface 23.

Figure 4:
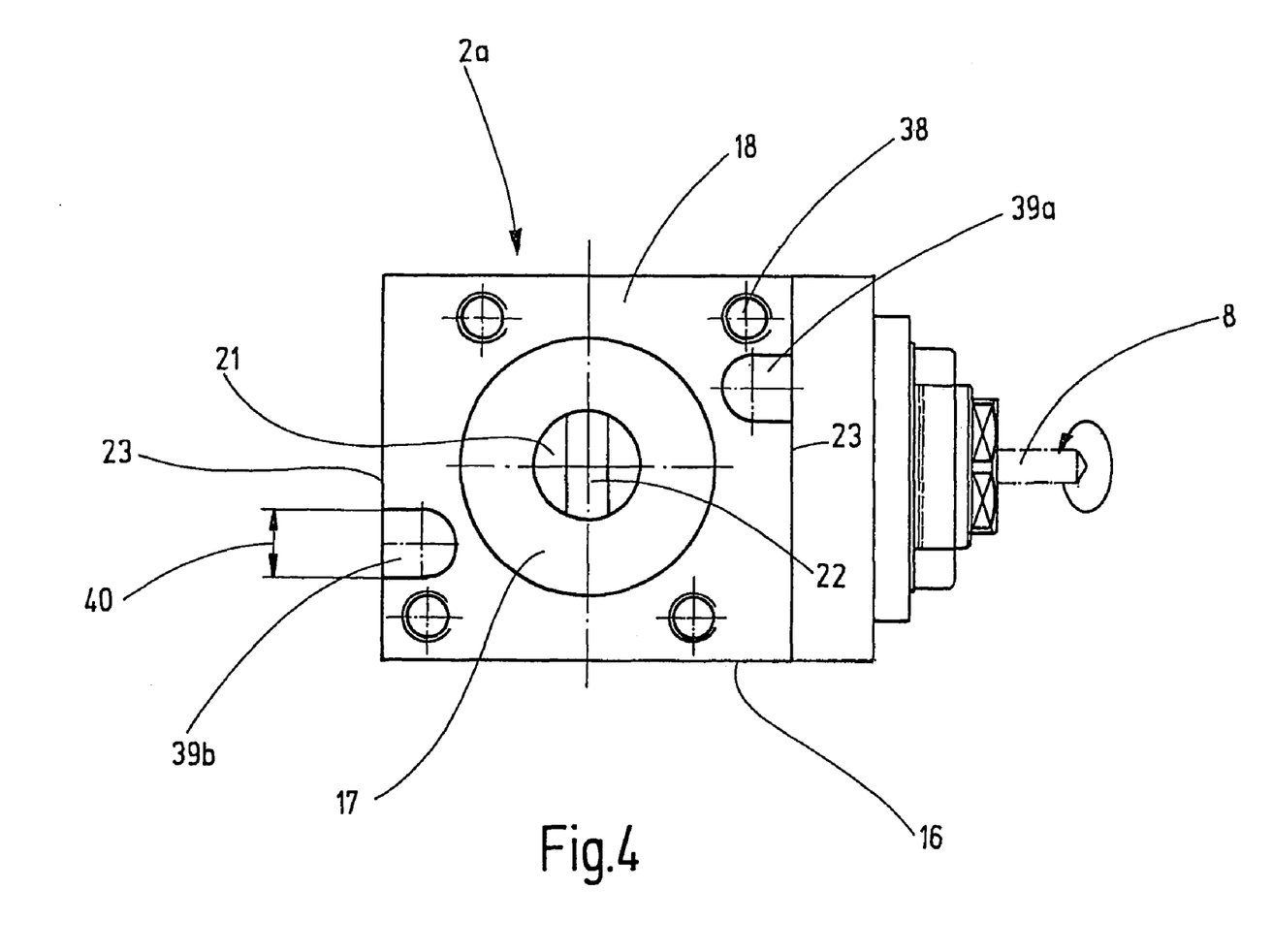
FIG. 4 shows a tool holder according to FIG. 2 in a top view of its bearing surface.

FIG. 4 shows a top view on the bearing surface 18 of the tool holder 2a of FIG. 2 without the stop strip 28. Four through-holes 38, are disposed parallel to one another in the receiving body 16 and receive the fastening screws, as is evident in this top view. In addition, two groove-shaped recesses 39a, 39b are disposed between the through-holes 38. These groove-shaped recesses 39a, 39b could however also be provided at another location between the through-holes 38. Each of the groove-shaped recesses 39a, 39b proceeds from a face in the area of the associated contact surface 23 and serves to receive one of the locating pins 15 (FIG. 1), which are provided on the tool support 1 in the area of each bearing surface 3. The groove width of the recesses 39a, 39b matches the diameter of the cylindrical locating pins 15, wherein to equalize tolerances, the groove width 40 of the recess 39b is somewhat larger than that of the other recess 39a, which determines the distance of the axis 41 of the coupling body 17 (FIG. 5) from the axis of the corresponding location hole 4 in the respective work station.

The coupling body 17 can be designed as a cylindrical or polygonal shank. It can be integrally formed on the receiving body 16 as one piece or, as illustrated in FIG. 5, be embodied as a piece separate from the receiving body. In this embodiment, two fastening screws 42 fasten the coupling body 17 to the receiving body 16 true-to-size and perfectly aligned. The receiving body 16 is designed for a tool holder 2b having a stationary tool, so that the coupling shaft 21 is superfluous. Of course, the tool holder 2a, which is equipped for a rotating tool 8, could also be embodied accordingly.

FIG. 6 shows the tool holder 2b of FIG. 5 in detail and in a top view of the stop strip 28, which is illustrated as a separate part in FIG. 7. In FIG. 6, it is evident that the threaded holes 26a, 26b, which receive the screw bolts 29, are disposed at an axial distance "A", while the threaded holes 27a, 27b, which are disposed on the opposite face of the receiving body 16 and indicated by dashes, are drilled into the receiving body 16 at a different (larger) axial distance "B". The holes 33 in the stop strip 28 for receiving the screw bolts 29 are designed as elongated holes, so that they can be used for both axial distances "A" and "B". To prevent confusion when fastening the stop strip 28 to the receiving body 16, indentations or countersinks 34a, 34b (cf. FIG. 5) for accommodating the screw heads 29a are embodied with the axial distance "A" or "B" respectively, so that the screw bolts 29 can be properly tightened only when the stop strip 28 has the correct mounting position.

Figure 8:
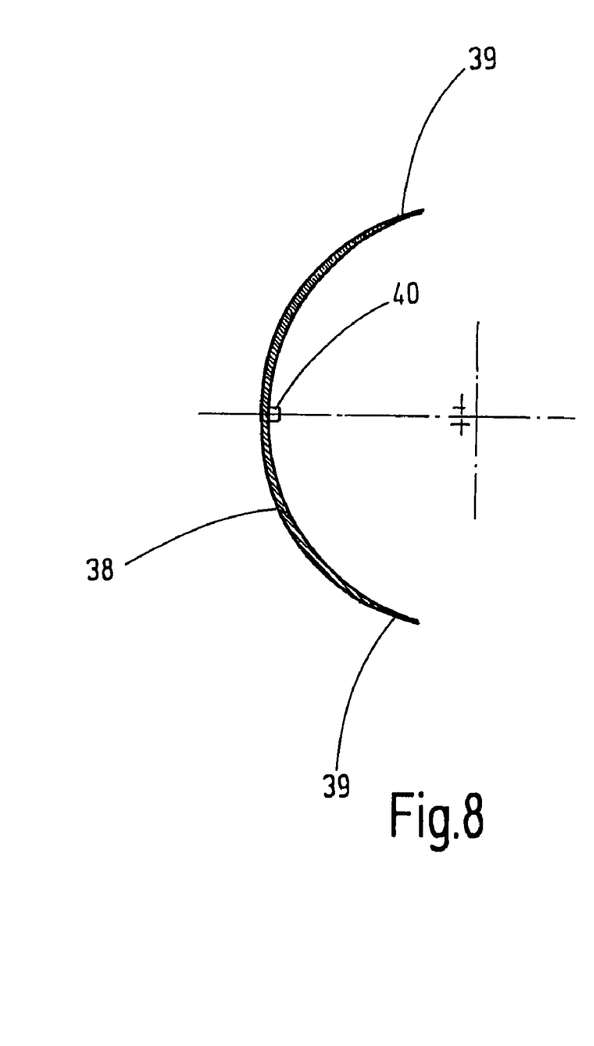
FIG. 8 shows a base of the spring element of the tool clamping device according to FIG. 1, in a top view and at another scale.
Figure 9:
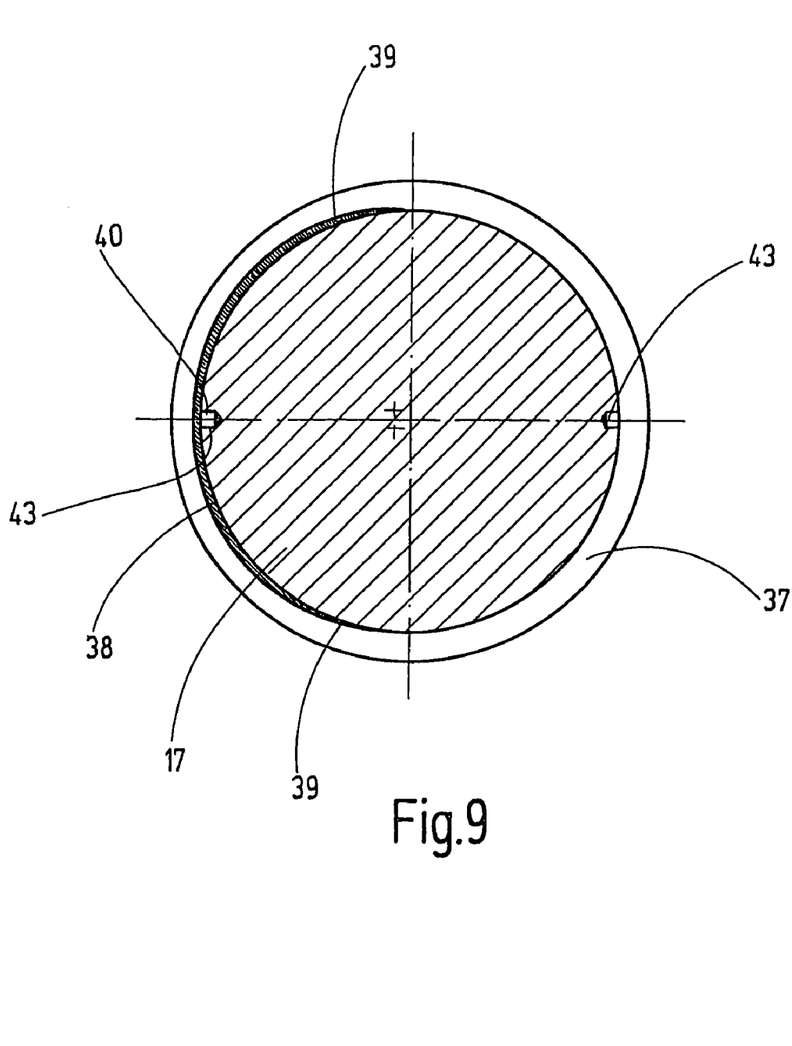
FIG. 9 shows the arrangement according to FIG. 3, cut along the line VIII-VIII of FIG. 3, in top view and at another scale, using the spring element and the base according to FIG. 8.

The base 38 for the O-ring 36 inserted into the peripheral groove 37 is illustrated in FIG. 8 and has already been explained in principle. As already mentioned, it can be inserted into the peripheral groove of the coupling body 17 on either the one or on the other side of the coupling body 17, depending on the arrangement of the stop strip 28 on the one or on the opposite face of the receiving housing 16 (corresponding to FIGS. 2 and 3). As illustrated in detail in FIG. 9, two coaxial pin holes 43, which fix the base 38 into its position in the groove 37 by means of the pin 40 (FIG. 8), are therefore provided in the peripheral surface of the coupling body 17 on the corresponding sides located diametrically opposite one another. The base 38 can be made out of metal or plastic by injection molding, for example, with the pin 40 as sprue part. In deviation of the embodiment illustrated in FIG. 8, it can also be shaped so that its diameter steadily decreases from the axis of the pin 40 toward the two ends 39. In the embodiment according to FIG. 8, the partially cylindrical base 38 has a constant thickness over the greatest part of its length, its ends, as already mentioned, being sharpened at 39. Alternatively, it would also be conceivable to shape the base of the peripheral groove 27 in conformity with the outside of the base 38, i.e. so that it has a variable distance from the axis of the coupling body 17 along its extent.

Figure 10:
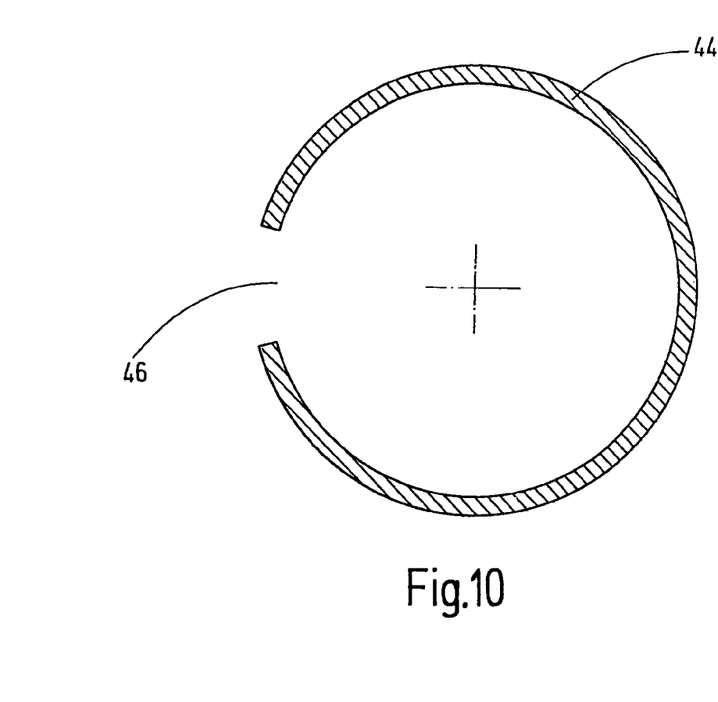
FIG. 10 shows another embodiment of a spring element of the tool clamping device according to FIG. 1 in cross section and in top view.
Figures 11, 12:
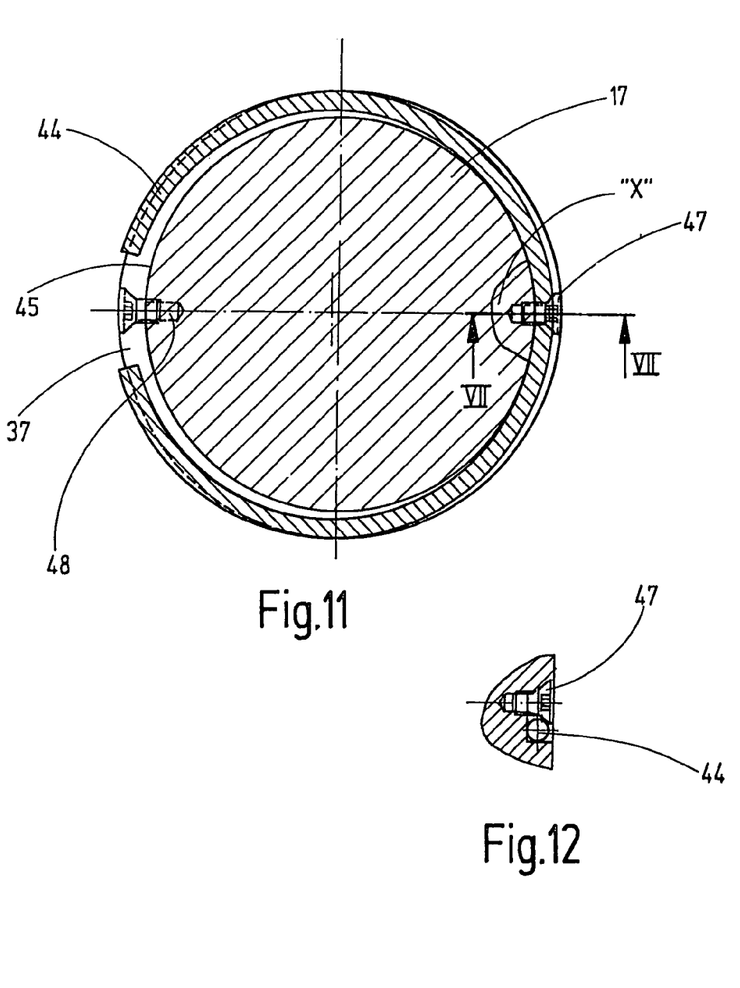
FIG. 11 shows the arrangement according to FIG. 9 in a corresponding cross-sectional illustration depicting the spring element according to FIG. 10.
FIG. 12 is a detail "X" of the arrangement according to FIG. 11, cut along the line VII-VII of FIG. 11 in side view.

In place of the O-ring 36 and the base 38, the elastic means separate from the stop strip 28 can also be designed differently. One example for this is illustrated in FIGS. 10 to 12. In this embodiment, there is provided a spring element in the form of a slotted, resilient wire ring 44, the inside diameter of which is larger than the diameter 45 of the base of the peripheral groove 37 of the coupling body 17. The wire ring 44 is guided into the peripheral groove 37 in the axial direction and undetachably clamped on the side located opposite the slot 46 by means of a countersunk screw 47. Depending on the operating position of the tool holder in correspondence with FIG. 2 or FIG. 3, the countersunk screw 47, is screwed into a threaded hole 48 on that point of the perimeter of the coupling body 17 that corresponds to the respective pin hole 43 of FIG. 9. In a modification of the tool holder 2, the wire ring 44 can accordingly also easily be turned into an operating position rotated by 180°. Since the wire ring 44 is clamped against the side wall and base 45 of the peripheral groove 37 by the countersunk screw 47 (cf. FIG. 5), its motion outside of the clamping point and especially in the area of the slot 46 is protected.

FIGS. 2 and 5 illustrate that at least one of the locating pins 15 (FIG. 1), which engages the groove-shaped recess 39b of the attached tool holder, is fastened to the tool support by means of a coaxial screw bolt 49, which is deeply inserted into a corresponding hole of the locating pin 15. To this end, the locating pin 15 can also be embodied eccentrically to eliminate positional tolerances. During the mounting movement of the tool holder 2 in the direction of the turret pivot axis 6, the locating pin 15 engages the groove-shaped recess 39b in the receiving body 16, determining the location. Basically, the arrangement could naturally also be built in reverse, i.e. so that locating pins, which engage corresponding indentations in the tool support 1 in the area of its bearing surface 3, are provided on the receiving body 16 in the area of its bearing surface 18.

Finally, an open-edged groove 50 is incorporated coaxial to the coupling shaft 21 in the area of the bearing surface 18 of the receiving body 16. An O-ring 51, which seals the receiving body 16 against the bearing surface 3 of the tool support 1 in the area of its bearing surface 18, is disposed in the groove 50 so that the location hole 4 is sealed in the direction of the working area.

The spring-elastic means in the form of the O-ring 36 with the base 58 or in the form of the resilient wire ring 59 is inserted into the peripheral groove 37 of the coupling body 17 in the correct position before a tool holder 2 is mounted on the tool support 1. The stop strip 28 is tightly screwed to the correct face of the tool holder 2. When the coupling body 17 is subsequently inserted into a location hole 4 of the tool support 1, the spring element 36 or 44 becomes prestressed in the location hole. As a result, the outside diameter of the coupling element 17, which is smaller than the inside diameter of the location hole 4, abuts the inside wall of the location hole 4 on the side located opposite the stop strip. In the course of further mounting movement, the sloping lead-in surface 31 of the stop strip 28 strikes the contact surface 35 on the face 25 of the tool support 1, i.e. the turret disc. As a result, the receiving body 16, in relation to FIG. 2, is pulled to the left and the spring element 36 or 44 becomes even more strongly prestressed. At the conclusion of the mounting movement, i.e. when the bearing surface 18 of the receiving body 16 rests on the bearing surface 3 of the tool support 1, an automatic alignment of the tool holder 2 to the face 25 of the tool support 1 occurs, the outside diameter of the coupling body 17 being radially free from the inside diameter of the location hole 4. The fastening screws 15 are now inserted and tightened.

In conclusion, let it be mentioned that the tool support 1, which is illustrated here in the form of a star turret, can also be a straight tool support or a turret disc with flat-sided arrangement of the location holes or be shaped otherwise.

In the embodiment example discussed above and illustrated in the drawing, the stop strip 28 is always screwed to a face of the tool holder 2. Also conceivable are embodiments in which the stop strip 28 is attached to a face of the tool support 1 in corresponding manner, such as indicated by dashes on the right side of FIG. 5. It then cooperates with a contact surface 35, which is provided on the associated face of the receiving body 16, in the described manner. The remaining associated elements are made in the described manner with corresponding deviation.

The stop strip 28 can also be integrally formed on the receiving body 16 or tool support 1 if this should be advantageous in the particular case.

Note that the o-ring 36 and the elastic wire ring 59, on the side of the coupling body that is diametrically opposite to the stop strip 28, is hidden in the peripheral groove 37, while on the other side adjacent the stop strip means 28 the o-ring 36 and the elastic wire ring 59 are radially protruding from the peripheral surface of the coupling body (see FIGS. 2 and 5 for example).

I claim:

1. A tool clamping device comprising
   (a) a tool support (1) having at least a socket (4) comprising, a bearing surface (3) facing outwardly from said socket;
   (b) at least a tool holder (2) having a receiving body (16), said receiving body (16) having a bearing surface (18) engaged to the bearing surface (3) of said tool support,
   alignment means for positionally accurate adjustment of said tool holder and its receiving body in relation to said tool support, said alignment means including,
   a stop strip means (28) connected to one of said receiving body (16) or said tool support (1), said stop strip means having at least a flat surface (30)
   a contact surface (35) on one of said tool support (1) or of said receiving body (16),
   said stop strip means extending beyond the joined bearing surface (18) of the receiving body (16) and the bearing surface (3) of said tool support (1), said stop strip means (28) having an insertion means to facilitate attachment of the receiving body (16) to the tool support (1), and
   elastic means (36, 44) for holding said stop strip means (28) laterally under prestress on said contact surface (35).

2. A tool clamping device according to claim 1, characterized in that said stop strip means (28) is one of a single-piece or a multiple-piece element.

3. A tool clamping device according to claim 2, characterized in that said stop strip means (28) is detachably fastened to one of the receiving body (16) or the tool support (1).

4. A tool clamping device according to claim 1, characterized in that said stop strip means has a pair of parallel flat surfaces (30) the two flat surfaces (30) of the stop strip means (28) being designed to alternatively engage one or both of a contact surface (35) and a receiving surface (23) on said receiving body (16) or said tool support (1), respectively.

5. A tool clamping device according to claim 4, characterized in that the tool support (1) has a receiving surface (23) for a stop strip means (28) on each of its two sides.

6. A tool clamping device according to claim 4, characterized in that the tool support (1) has a receiving surface (23) for a strop strip means (28) on each of its two sides.

7. A tool clamping device according to claim 5, characterized in that the stop strip means (28) can alternatively be positioned on one or the other of the receiving surface (23) of the receiving body (16) or of the tool support (1), respectively, such that one of its flat surface (30) can be brought into engagement with the contact surface (35) of the tool support (1) or the receiving body (16), respectively.

8. A tool clamping device according to claim 7, characterized in that the receiving body (16) or the tool support (1) has means in the area of the receiving surface (23) for lateral fastening of the stop strip means (28) to the receiving body or tool support, respectively.

9. A tool clamping device according to claim 8, characterized in that the means for lateral fastening of the stop strip means (28) includes at least two spaced screw connecting means (29; 26a,b; 27a,b) and that the distances (A,B) of the two screw connecting means on the receiving two surfaces (23) are different from one another.

10. A tool clamping device according to claim 4, characterized in that the insertion device of the stop strip means (28) comprises at least one tapering edge (31) extending from said said at least one flat surface (30) and away from said receiving body (16) or tool support (1).

11. A tool clamping device according to claim 1, wherein said alignment means further includes at least two spaced apart locating elements (15), each cooperating with a counter element (39a, 39b), extending inwardly from a bearing surface of a counter element (18,3) of one of said receiving body (16) or of said tool support (1).

12. A tool clamping device according to claim 11, characterized in that each pair of locating elements (15) projects axially over the bearing surface (18,3) of the receiving body (16) or of the tool support (1) and into one of a groove (39a, 39b) in the region of the other bearing surface (18) of the tool support (1) or the receiving body (16).

13. A tool clamping device according to claim 1, characterized in that the receiving body (16) has a coupling body (17) projecting axially over its bearing surface (18) and the axis (41) of the coupling body is aligned perpendicular to the bearing surface and that the tool support (1) is designed with a location hole (4) for the coupling body in the area of its receiving surface (3) and that said elastic means is disposed in the area of the coupling body (17) and/or location hole (4).

14. A tool clamping device according to claim 13, characterized in that the elastic means has at least one spring element (36, 44), which supports itself on the tool holder (2) or the tool support (1) and by means of which the receiving body (16) is pressed against the contact surface (35) of the tool support or of the receiving body (16) or by the stop strip means (28) under prestress.

15. A tool clamping device according to claim 13, characterized in that the location hole (4) has a width that permits limited lateral movement of the receiving body (17).

16. A tool clamping device according to claim 13, characterized in that the elastic means is a spring-elastic ring (44), which is inserted into a corresponding indentation (37) of the cylindrical coupling body (17) or the cylindrical location hole (4) across at least a portion of its circumference such that it has limited has limited radial movement and by which means the inserted coupling body (17) can be elastically prestressed perpendicularly to the axis (41) of the location hole (4) in a direction away from the contact surface.

17. A tool clamping device according to claim 16, characterized in that the elastic ring is a split spring-elastic ring (44).

18. A tool clamping device according to claim 17, characterized in that the spring-elastic ring (44) has a variable radial thickness along its circumference.

19. A tool clamping device according to claim 16, characterized in that the elastic ring is an O-ring (36) which is inserted into a groove (37) in which it is radially supported at varying distance from the axis (41) of the coupling body (17).

20. A tool clamping device according to claim 1, characterized in that liquid proof sealing means (50) for sealing the location hole (4) are disposed on the receiving body and/or on the tool support in the area of the respective bearing surface.

21. A tool clamping device according to claim 1, characterized in that the tool support (1) has threaded holes (14) in the area of its bearing surface (3) as fastening means for the tool holder (2).

22. A tool clamping device according to claim 1, characterized in that a coupling body (17) projects axially from the bearing surface (28) of said receiving body and that spring means (36, 38; 44) acting radially on one side are provided on the coupling body.

23. A tool clamping device according to claim 22, characterized in that the spring means has an O-ring (360, which is radially supported in a groove (37) of the coupling body (17) such that it extends radially outwardly from the coupling body.

24. A tool clamping device according to claim 22, characterized in that the spring means has a split, resilient ring (44), which is disposed on the coupling body (17), surrounding it.

25. A tool clamping device comprising
(a) a tool support (1) having at least a socket, a bearing surface (3) facing outwardly from said socket and a contact surface (35) extending from said bearing surface (3) in a direction away from and substantially perpendicular to said bearing surface (3);
(b) a tool holder (2) having a receiving body (16), and a coupling body (17) extending therefrom, said receiving body (16) having a bearing surface (18) engaged to the bearing surface (3) of said tool support and a receiving surface (23) substantially perpendicular to its bearing surface (18) said coupling body (17) extending into said socket along a path substantially perpendicular to said receiving body (16) bearing surface
(c) alignment means for positionally accurate adjustment of said tool holder and its coupling body in relation to said tool support, said alignment means including,
(d) a stop strip means (28) connected to one of said receiving body (16), said stop strip means having a pair of parallel flat surfaces (30), one of said flat surfaces (30) engaged to said receiving surface (23) of said receiving body (16) and said contact surface (35) of said tool support (1) and extending beyond the joined bearing surface (18) of the receiving body (16) and bearing surface (3) of said tool support (1), said stop strip means (28) having wedge-shaped bevels (31) each extending from one of said flat surfaces (30) and tapering inwardly toward one one another to thereby facilitate attachment of the receiving body (16) to the tool support (1), and
elastic means (36, 44) for holding said stop strip means (28) laterally under prestress on said contact surface (35).

26. A tool holder (2) that is adapted to be mounted on a tool support (1), comprising a housing-shaped receiving body (16) having an outwardly facing bearing surface (18) located on its outside and configured to mount said tool holder with its bearing surface positioned onto a corresponding bearing surface of said tool support, one of a stop strip means (28) or a contact surface (35) on one side of and adjacent to that bearing surface, said stop strip means (28) having at least a flat surface (30) extending beyond said bearing surface (18) for engagement with a contact surface on said tool support, said stop strip means (28) having insertion means to facilitate attachment of the receiving body (16) to said tools support (1), and said tool holder comprising elastic means (36, 44) for holding said stop strip means (28) laterally under pre-stress on a contact surface (35) of a tool support when the receiving body (16) is attached to said tool support.

27. A tool holder according to claim 26, characterized in that said stop strip means (28) is one of a single- piece of multiple-piece element.

28. A tool holder according to claim 26, characterized in that said stop strip means (28) is detachably fastened to the receiving body (16).

29. A tool holder according to claim 26, characterized in that the receiving body (16) has at least a receiving surface (23) for a stop strip means (28).

30. A tool holder according to claim 29 characterized in that the receiving body (16) has at least two sides and a receiving surface (23) for a stop strip means (28) on each of its two sides.

31. A tool holder according to claim 30 characterized in that the stop strip means (28) it is configured to be alternatively positioned on one or the other of said receiving surfaces (23 of the receiving body (16), such that one of its flat surfaces (30) can be brought into engagement with the contact surface (35) of the tool support.

32. A tool holder according to claim 31 characterized in that the receiving body (16) has means in the area of a receiving surface (23) for lateral fastening of stop strip means (28) to the receiving body.

33. A tool holder according to claim 32 characterized in that the means for lateral fastening of the stop strip means (28) includes at least two spaced screw connecting means (29; 26A,B; 27A,B) and that the distances (A,B) of the two screw connecting means on the two receiving surfaces (23) are different from one another.

34. A tool holder according to claim 26 characterized in that the insertion device of the stop strip means (28) comprises at least one tapering edge (31) extending from said at least one flat surface (30) and away from the receiving body (16).

35. A tool holder according to claim 26 characterized in that the receiving body (16) has a coupling body (17) projecting axially over its bearing surface (18) and the axis (41) of the coupling body is aligned perpendicular to the bearing surface and that the elastic means is disposed in the area of the coupling body (17).

36. A tool holder according to claim 35 characterized in that the elastic means has at least one spring element (36, 44) which is inserted into a corresponding indentation (37) of the coupling body (17) across at least a portion of its circumference such that it has limited radial movement.

37. A tool holder according to claim 36 characterized in that the elastic ring is one of a split-spring elastic ring (44) or an o-ring (36).

38. A tool holder according to claim 37 characterized in that said o-ring (36) is inserted into a groove (37) in which it is radially supported at varying distance form the axis (41) of the coupling body (17).

39. A tool holder according to claim 38 characterized in that sealing means (50) are disposed on the receiving body (16) in the area of its bearing surface.

* * * * *

UNITED STATES PATENT AND TRADEMARK OFFICE
CERTIFICATE OF CORRECTION

| | | |
|---|---|---|
| PATENT NO. | : 8,037,791 B2 | Page 1 of 1 |
| APPLICATION NO. | : 12/313942 | |
| DATED | : October 18, 2011 | |
| INVENTOR(S) | : Manfred Neumeier | |

It is certified that error appears in the above-identified patent and that said Letters Patent is hereby corrected as shown below:

In column 9, line 8, please delete "strop" and insert -- stop --.

In column 9, line 30, please delete "said".

In column 9, line 67, please delete the first set of "has limited".

In column 10, line 27, please delete "(360" and insert -- (36) --.

In column 10, line 61, please delete the first "one".

In column 12, line 28, please delete "o-ring" and insert -- O-ring --.

In column 12, line 30, please delete "o-ring" and insert -- O-ring --.

In column 12, line 31, please delete "form" and insert -- from --.

Signed and Sealed this
Twentieth Day of March, 2012

David J. Kappos
*Director of the United States Patent and Trademark Office*